United States Patent

[11] 3,622,513

| [72] | Inventor | George Miller |
| | | Houston, Tex. |
| [21] | Appl. No. | 728,331 |
| [22] | Filed | May 10, 1968 |
| [45] | Patented | Nov. 23, 1971 |
| [73] | Assignee | Oil Base, Inc. |
| | | Houston, Tex. |

[54] OIL BASE FLUID COMPOSITION
4 Claims, No Drawings

[52] U.S. Cl. .................................... 252/8.5 M,
208/6, 252/8.5 P
[51] Int. Cl. .................................... C10m 1/10,
C10m 1/24, C10m 1/16
[50] Field of Search............................ 252/8.5 M, 8.55 A

[56] References Cited
UNITED STATES PATENTS

| 1,575,945 | 3/1926 | Stroud............................ | 252/8.5 |
| 2,223,027 | 11/1940 | Dawson et al. ............... | 252/8.5 |
| 2,316,968 | 4/1943 | Miller............................ | 252/8.5 |
| 2,475,713 | 7/1949 | Miller............................ | 252/8.5 |
| 2,779,735 | 1/1957 | Brown et al................... | 252/8.55 |
| 3,017,349 | 1/1962 | Fischer........................ | 252/8.5 |
| 3,046,222 | 7/1962 | Phansalkar et al............ | 252/8.55 |
| 3,099,624 | 7/1963 | Wilson ........................ | 252/8.5 |

OTHER REFERENCES

Rogers, Composition and Properties of Oil Well Drilling Fluids, second edition, Published 1953 by Gulf Pub. Co. of Houston, Texas, Pages 462 to 471.

*Primary Examiner*—Herbert B. Guynn
*Attorneys*—Arnold, Roylance, Kruger and Durkee, Tom Arnold, Donald C. Roylance, Walter Kruger, Bill Durkee, Frank S. Vaden, III and John F. Lynch

ABSTRACT: An oil base drilling fluid having very low oil fluid loss even under extreme conditions of borehole temperature and pressure contains a primary weight material comprising barium sulfate or the like and a small amount of a secondary weight material comprising inert particulate material having a particle size less than about 3 microns. Inert metallic oxides such as iron oxide and titanium dioxide are suitable secondary weighting materials.

OIL BASE FLUID COMPOSITION

BACKGROUND

The instant invention relates to oil base drilling fluids of the type employed in oil and gas wells. More particularly, the instant invention provides a novel oil base drilling fluid composition which possesses improved plastering properties and reduced oil fluid loss properties even at extreme conditions of borehole temperature and pressure.

Oil base drilling fluids usually include, in addition to an oil fluid base, a weight material, a plastering material, a small amount of water, and various additives to produce a gellike structure within the fluid. These compounds interact during drilling under downhole conditions to produce a filter cake or sheath on the face of the formation, i.e., at the fluid formation interface, to prevent loss of the drilling fluid to the formation.

This filter cake or sheath is water impermeable and substantially oil impermeable so that virtually none of the fluid base or the water in the fluid is lost into the formation. The small amount of oil fluid filtrate which may penetrate the sheath does not substantially effect formation permeability. However, significant losses of oil from the fluid can upset the component balance of the oil base fluid and produce changes in viscosity of the drilling fluid necessitating the addition of supplemental oil to the circulating fluid at the surface. There should be no water penetration of the sheath, since an aqueous invasion of the formation could destroy, at least partially, the formation permeability.

After drilling is completed, when the well is produced, the filter cake or sheath at the fluid formation interfaces is flushed away and dissolved by the crude oil flowing into the borehole. Ideally, it is normally desirable that as little fluid loss of any type as possible be permitted during drilling to leave the formation as nearly as possible in its natural or original state and to avoid the expense of addition of makeup oil to the drilling fluid.

Under severe conditions of temperature and pressure ad may be encountered in very deep boreholes, the filter cake formed by the oil base fluid may tend to break down and permit undesirably large fluid losses.

The constituents of the drilling fluid which primarily result in formation of the filter cake are the asphaltous material and the weighting agent. The weighting agent, normally barium sulfate, is of a particle size of the order of 100 to 200 microns. Even the finest barium sulfate or calcium carbonate employed in oil base drilling fluids usually constitutes particles no smaller than about 325 mesh, not smaller than about 30 to 50 microns. Although the asphaltous material acts as a filler or plaster between these particles in the drilling fluid filter cake, it is postulated that under conditions of high temperature and pressure this asphaltous material tends to become more fluid and the small interstices between the particles of weighting material tends to permit fluid loss through the filter cake to the formation.

It is a continuing effort to improve the fluid loss reducing properties of oil base fluids to minimize even small oil fluid losses to the formation and to stabilize oil base drilling fluids against breakdown under severe borehole conditions.

SUMMARY OF THE INVENTION

It is accordingly an object of the instant invention to provide a new oil base drilling fluid. It is another object of this invention to provide an oil base drilling fluid having a reduced oil fluid loss.

It is a further object of this invention to decrease oil fluid loss in oil base fluids by providing a secondary weight material of micron size in the fluid.

It is a further object of this invention to provide an airblown asphalt for use as a plastering agent in oil base fluids to produce improved fluid loss characteristics which contains a secondary weight phase incorporated therein.

It is among the further objects of this invention to provide a novel oil base drilling fluid having low fluid losses at high borehole temperatures utilizing a blown asphalt containing a secondary weight phase of micron size.

It is a further object of this invention to improve the desirability of oil base drilling fluids by alteration of the fluid coloration while simultaneously improving the fluid loss properties of the mud.

These and other objects are achieved by the instant novel oil base drilling fluids which contain a small amount of a secondary weighting material inert to the fluid and having a particle size of no more than about 3 microns. Generally at least about 5 pounds per barrel of secondary weighting material is used. The secondary weight material may be added directly to an otherwise complete oil base fluid without substantially affecting the density thereof. In one embodiment of this invention, however, wherein airblown asphalt is employed in the drilling fluid, the secondary weight material is added to the asphalt charging stock during the airblowing operation.

Any hard particulate inert material conveniently reducable to micron size may be employed as a secondary weighting material. Suitable inert materials for the secondary weight phase are the metallic oxides and various inorganic pigment materials since the substances are commonly inert and since these materials are readily available in finely divided form. These materials may alter the color of the mud from the typical black color of oil base drilling muds. Typical preferred secondary weight materials are iron oxides and titanium oxide.

DESCRIPTION OF THE SPECIFIC EMBODIMENTS

The novel drilling fluids of this invention are analogous to known oil base fluid compositions save that a second weighting material having a particle size of only several microns is added.

It will be appreciated that the fluid loss of an oil base drilling fluid is dependent on the colloidal content of the fluid and the bridging effect of the particulate material in the fluid. Measured addition of weighting material or a particulate lost circulation material usually improves fluid loss characteristics, so long as the amount of such solid material does not become so great that the colloidal nature or amount in the fluid is adversely affected. However, addition of weighting material can substantially alter the density of the fluid from the desired density and use of a lost circulation asphalt can change the viscosity and other performance characteristics of the fluid.

The instant invention however accomplishes a decrease in the fluid loss of a fluid without substantially altering the density at all and without substantial change of viscosity or gel characteristics.

Thus it is desirable to effect the fluid loss improvements in accordance with the instant invention to utilize a secondary weight material which is uniformly small in particle size so that maximum effectiveness of the small micron size particles can be realized without excess effect upon density of the fluid.

The secondary weight material employed in accordance with this invention is an inert solid material having a particle size less than about 3 microns. Typically, the secondary weight material is added in amounts ranging from about 5 to about 40 pounds per barrel. Since an oil field barrel contains 42 gallons, the contribution to fluid density by addition of the secondary weighting material in accordance with this invention will range to less than about 1 pound per gallon.

The secondary weight material may be added to the drilling fluid by various methods. Most simply, the secondary weight materials are physically added to an already formulated drilling fluid by suitable agitation. In accordance with a further specific aspect of this invention, when airblown asphalt is utilized as the plastering agent in the fluid, the secondary weight material can be added to the asphalt charging stock during the blowing operation. The secondary weight materials employed must, of course, be inert and according will have no effect on the asphalt-blowing operation.

It has been found that when the particulate secondary weight material is added directly to an otherwise formulated oil base drilling fluid that it is preferable to utilize at least about 10 pounds per barrel ranging to as high as 40 pounds per barrel. On the other hand, however, if the secondary weight material is added to the asphalt during the airblowing operation, it has been found that substantially less secondary weighting agent can be employed to achieve a substantial improvement in fluid loss characteristics.

The addition of secondary weight materials to the charging stock during the airblowing operation enabled achieving a higher melting point airblown asphalt from the blowing operation than would otherwise be obtained while enabling maintenance of the penetration of the airblown asphalt product at a desirably high level.

Normally, oil base drilling fluids employ an airblown asphalt having a high-melting point, i.e., a melting point above 260° F., and preferably around 260°–280° F. although asphalts having melting temperatures up to about 310° F., or higher, may be employed. The higher the melting point of the asphalt (within limits) the better is the gel strength which will be imparted by that asphalt to the drilling fluid. Not all high-melting point asphalts lend good gel strength as some stocks when airblown until they have a low penetration, i.e., from 0 to 5 at 25° C., impart little or no gel strength, while others may impart a satisfactory gel strength. The asphalt must be selected both from the standpoint of its melting point and its penetration. The penetration of a high-melting point blown asphalt is normally lower than the penetration of the lower melting point asphalts. Ordinarily, as the penetration of the asphalt decreases (between 8 to 0), its plastering properties decrease. The asphalt selected must, therefore, be one having a high-melting point and also a satisfactorily high penetration. The instant novel method enables blowing the asphalt to a higher melt point while retaining a desirably higher level of penetration than would otherwise be obtained without adding the secondary weight material.

It was also noted that addition of secondary weighting material to the asphalt charging stock in the blowing operation does not produce as intense a change of color in the ultimate drilling fluid product as would the physical admixture of a comparable amount of secondary weighting material to a completely formulated drilling fluid product prepared from asphalt containing no secondary weight material.

It would appear that the improvement in fluid loss characteristics resulting from addition of secondary weight material to the asphalt charging stock prior to airblowing is caused at least in part by a change which is effected in the colloidal structure of the asphaltous material producing an increase in the penetration of the airblown asphalt product. In addition, it may be postulated that the secondary weight material functions to reduce fluid loss by blocking the small interstices between the larger particles or primary weight material in the filter cake formed by fluid at the face of the formation.

The amount of pigment which may be added to the charging stock during the airblowing will accordingly be dictated by the melting point and penetration desired in the airblown asphalt. Typically, the amount of secondary weighting material should not exceed about 45 to 50 percent by weight of the asphalt-charging stock being airblown. Thus, in adding secondary weighting material in this manner, it is preferred that the concentration of secondary weight material be not more than about 20 to 22 pounds per barrel of the ultimate weighted mud product. In concentrations greater than this, the airblowing operation becomes difficult because the viscosity of the charging stock increases to a degree that makes handling difficult.

The addition of the secondary weighting material to the asphalt charging stock may be accomplished by physical admixture of the weight material with the charging stock. Desirably, some agitation should follow to evenly distribute the weight material through the charging stock.

Following admixture of secondary weighting material and charging stock the asphalt charging stock is blown in the normal manner. The secondary weight material increases the melt point of the blown product and enables maintenance of a desirably higher penetration.

The secondary weight material may be any inorganic particulate material capable of being reduced to a particle size of less than 3 microns. A secondary weight phase having a particle size less than 1 micron is highly preferred. The secondary weight material must also be inert to the oil base system under the borehole conditions at which use is contemplated.

Preferred secondary weight materials accordingly are the inorganic pigments since those substances are readily available in uniform finely divided form. These materials can also result in a change in the characteristic color of oil base drilling fluids which will be further discussed below.

Most preferred inorganic pigments are the inert metal oxides of metals other than the alkali or alkaline earth-type metals. The alkali or alkaline earth metal oxides readily form hydroxides in drilling fluids and hence become a reactive ingredient which is not desired for the secondary weight phase in the fluids of this invention.

Suitable metallic oxides include titanium dioxide, iron oxide, zirconium oxide, zinc oxide, chromium oxide and the like. Titanium dioxide and iron oxide are preferred since they are readily available in uniform sizes less than 3 microns and usually are available in particle sizes less than 1 micron. Titanium dioxide is highly preferred for use when physical addition to an already completely formulated mud is effected. Even very fine titanium dioxide, having a particle size less than 0.25 microns is a very effective secondary weighting agent when used in this manner. Iron oxides such as ferric oxide are preferred for addition to the asphalt during airblowing. It should be pointed out that a variety of such iron oxide mixtures usually containing a predominant amount of ferric oxide are commonly available in finely divided form. Some of these materials are relatively impure materials available in pigment particle size. Others are naturally occurring hematites in varying degrees of purity. Some iron oxide materials available in finely divided form are synthetic oxides and mixtures prepared by special processes. These finely divided iron oxides invariably contain some ferric oxide, and hence it will be understood herein that reference to iron oxide and ferric oxide includes such art recognized materials. Of course, other inorganic materials which are suitably inert may also be employed, and inasmuch as the weighting materials are inert, mixtures of secondary weighting materials may be used if desired.

Characteristically, oil base drilling fluids are substantially dark brown to black in color because of the asphalt and diesel oil constituents. When the secondary weighting material is a pigment-type material a visible change in the color of the oil base fluid may be produced. For example, by addition of titanium dioxide, the mud can be changed to a light tan color, whereas iron oxide produces a reddish color. These distinctively colored fluids can be advantageously employed at the wellsite for a variety of purposes. For example, injection of a slug or pill of distinctively colored fluid can be employed to establish the length of time of the circulation cycle of fluid from the surface to the borehole bottom and back to the surface.

The basic composition of the oil base drilling fluids of this invention is otherwise well known to the art. As one typical example, such drilling fluids can contain an oil fluid base such as diesel oil; a plastering agent such as blown asphalt which exists suspended in the fluid in a colloidal-type state; a weighting material such as barium sulfate or calcium carbonate and a gel-producing agent such as calcium naphthenate, generally provided by combining naphthenic acid and lime in the fluid. Also, a small amount of water is generally present in the fluid, usually less than 5 percent by volume.

The fluid may also contain a lost circulation additive such as particulate natural asphalt (e.g., Gilsonite, glance pitch, grahamite, etc.) or particulate blown asphalt. The use of these materials as lost circulation materials is fully disclosed and discussed in U.S. Pat. No. 2,773,670.

Generally, the oil base drilling fluids of this invention are weighted with the primary weighting material and secondary weighting material to about 10 to 25 pounds per gallon. Most often, the addition of a secondary weighting phase in accordance with this invention is most effective in reducing fluid loss in fluids having densities ranging from 10 to 20 pounds per gallon without substantially increasing the density or the viscosity.

It will be understood that although this invention has been particularly described with respect to an oil base well drilling fluid containing asphaltous material in colloidal or particulate form, that the compositions of this invention may be adapted to various oil well uses wherein decreased fluid loss is desirable.

Furthermore, departures from the specific embodiments and exemplary compositions above may be indulged in without departing from the spirit or scope of the instant invention. For example, the instant invention is applicable to other types of oil base drilling fluid systems wherein asphaltic crude oil or reactive-type clays are employed to function in the place of asphalt material and the plastering agent of the fluid.

The following examples are illustrative:

EXAMPLE 1

A series of drilling mud samples were prepared, each simulating a barrel of oil base drilling fluid. Each test barrel contained 42.5 grams of blown asphalt, 11 grams of lime, 3.5 grams of naphthenic acid, 300 ml. of diesel oil and 17.5 ml. of water. Two control samples were then weighted to a density of 16 pounds per gallon with ordinary barium sulfate (customarily used in oil well drilling fluids having a particle size of 90 percent through 200 mesh, and 88 percent through 325 mesh). An amount of an alkyl aryl sulfonate equivalent to 3 pounds per barrel was blended into the mixture. An average fluid loss reading was taken for the two control samples and this average is reported below as "control."

Test samples were prepared by addition of iron oxide and titanium dioxides to the unweighted fluid mixture in amounts corresponding to 35 pounds per barrel and these samples were then weighted with ordinary barium sulfate as above to an overall density of 16 pounds per gallon, identical to the density of the control samples. Three pounds per barrel of sulfonate additive were also blended into the mixture.

Each sample was tested for fluid loss by maintaining the fluid in a high-temperature, high-pressure filter press at 300° F. and 500 p.s.i. for 30 minutes. Each sample was then hot-rolled in an oven at 200° F. for 24 hours and retested for fluid loss under the same conditions of 300° F. at 500 p.s.i. for 30 minutes.

| Sample | Secondary weighting agent | Particle size | Before hot roll, mil | After hot roll, mil |
|---|---|---|---|---|
| Control | | | 2.5 | 2.6 |
| 1 | Iron oxide | 97% less than 3μ, 94% less than 1μ | 2.2 | 2.4 |
| 2 | TiO₂ | Average 0.18μ | 1.6 | 2.0 |
| 3 | TiO₂ | Average 0.19μ | 2.2 | 2.0 |

EXAMPLE 2

Four test samples of oil base drilling fluid were prepared as above utilizing different batches of blown asphalt and diesel oil than used in example 1. These test samples were weighted to 16 pounds per gallon with ordinary barium sulfate (98 percent through 200 mesh, 88 percent through 325 mesh).

One sample was tested without further addition of weighting agent. To the remaining samples were added equivalent amounts of addition weight material as follows:

Sample 5—Titanium dioxide (average particle size 0.18μ) corresponding to 22 pounds per barrel;

Sample 6—Finely ground barium sulfate (particle size 98.3 percent less than 44 microns) correspond to 22 pounds per barrel;

Sample 7—Additional barium sulfate similar to primary weighting agent corresponding to 22 pounds per barrel.

The following results were obtained upon testing for fluid loss at 300° F. and 500 p.s.i. for 30 minutes.

| Sample | Fluid loss (ml.) Before hot roll | Fluid loss (ml.) After hot roll |
|---|---|---|
| (4) All ordinary barium sulfate to 16 p.p.g. | 1.6 | 1.5 |
| (5) Sample 4 plus TiO₂ in conc. corresponding to 22 lb./bbl. | 1.3 | 0.8 |
| (6) Sample 4 plus fine barium sulfate in conc. corresponding to 22 lb./bbl. | 1.0 | 1.2 |
| (7) Sample 4 plus ordinary barium sulfate in conc. corresponding to 22 lb./bbl. | 1.0 | 1.4 |

The fluid having a secondary weighting phase of titanium dioxide showed much lower fluid loss after hot roll, simulating performance at prolonged high temperature and pressure in a borehole.

All the samples above showed essentially the same viscosity properties.

EXAMPLE 3

Airblown asphalt was prepared by charging residual oil to a pilot still and blowing. In two samples, iron oxide was added to the charging stock prior to blowing. One sample was prepared without iron oxide as a control.

To prepare the asphalt-iron oxide blends, residual oil was added to a pilot still and heated to about 200° F. Red iron oxide having a particle size of less than 3 microns (97.3 percent less than 1 micron) was then added with stirring until a smooth homogeneous mixture was obtained. The airblowing of the charging stock was then undertaken with the two iron oxide containing samples and the control by admitting air to the pilot still and maintaining the temperature as close as possible to 450° F. to 480° F. for 6 hours.

| | Wt. % iron Oxide | Concentration of Iron Oxide (lb./bbl.) | Temp. °F. |
|---|---|---|---|
| Control | 0 | 0 | 450°–480° F. |
| Sample 8 | 11.0 | 5.7 | 450°–480° F. |
| Sample 9 | 33.2 | 20.1 | 450°–480° F. |

After blowing was completed, the control sample and the iron oxide containing samples were tested for melting point (by the ring and ball method) and penetration. The following properties were noted:

| | Melt Pt. | Penetration |
|---|---|---|
| Control | 268° F. | 6 |
| Sample 8 | 284° F. | 4 |
| Sample 9 | 318° F. | 2 |

Normally, the residual oil charging stock of the type used in the above samples cannot be airblown to a melting point of 300° F. without suffering a severe reduction in penetration to between 0 and 1. It was found that addition of iron oxide appeared to increase the melting point of the asphalt and also enabled attaining a higher melting point with the ultimate asphalt product without suffering a reduction of penetration below 2.

Each asphalt sample was blended with mixing oil, water, naphthenic acid, and lime in amounts as indicated in example 1 above. Small amounts of an alkyl aryl sulfonate and stearic acid were also added to each formulation.

Prior to addition of barium sulfate, the three samples were tested for fluid loss characteristics at 300° F. and 500 p.s.i. for 30 minutes. The control sample and sample 8 (5.7 lb./bbl. of iron oxide) had an uncontrollable fluid loss. The fluid loss of sample 9 (20.1 lb./bbl. of iron oxide) however was only 3.2 ml. at 300° F. and 500 p.s.i. for 30 minutes without any other weighting agent.

Each sample was then weighted to 16 pounds per gallon with barium sulfate (98 percent through 200 mesh and 88 percent through 325 mesh). Measurements of apparent viscosity (Va), plastic viscosity and yield point (YP) were taken in addition to fluid loss measurements at 300° F. and 500 p.s.i. for 30 minutes.

|  | Ca (cps.) | Vp (cps.) | YP (lb./100 ft.²) | Fluid loss (ml.) |
| --- | --- | --- | --- | --- |
| Control | 66 | 60 | 12 | 4.8 |
| Sample 8 | 80 | 70 | 20 | 2.0 |
| Sample 9 | 83 | 72 | 22 | 2.0 |

The coloration of these fluids was not as intense as the coloration produced by direct addition of iron oxide to the drilling fluids as done in the examples previously cited.

It will be noted that blowing the asphalt with the iron oxide also had the effect of increasing fluid viscosity. From these tests, it is apparent that the effect of reduced fluid loss can be obtained by adding lesser amounts of secondary weighting material to the asphalt if the material is added during the airblowing operation. However, it is also apparent that this addition of secondary weight material to the asphalt during the blowing operation probably changes the colloidal nature of the airblown asphalt product itself to achieve the improvements in fluid loss characteristics, and enables blowing of individual charging stocks to a higher melt point while retaining a desirable penetration.

What is claimed is:

1. A low fluid loss oil base drilling fluid composition suitable for use in drilling operations under borehole conditions of elevated temperatures and pressures which comprises a primary inert particulate weighting material having a particle size no smaller than about 30 to 50 microns supported in an oil base fluid, blown asphalt having a melting point of at least 260° and a penetration of at least 2, said blown asphalt containing a secondary inert particulate metallic oxide weighting material having a particle size less than 3 microns added to the charging stock for blowing said asphalt prior to the blowing operation in an amount up to 45 percent by weight of such charging stock, and calcium naphthenate, the said amount of said blown asphalt and said calcium naphthenate being sufficient in combined amount to support said weight material and to emulsify water normally encountered in drilling operations and said secondary weighting material being present in an amount of from about 5 to about 22 pounds per barrel of said drilling fluid.

2. The oil base fluid of claim 1 wherein said secondary weighting agent is titanium dioxide.

3. The oil base of claim 1 wherein said secondary weighting agent has a particle size of 1 micron.

4. The oil base fluid of claim 1 wherein said secondary weighting agent is iron oxide.

* * * * *